Aug. 6, 1940.   H. A. MOORE   2,210,494
TUNING CONDENSER FOR HIGH FREQUENCY PURPOSES
Filed Dec. 8, 1937
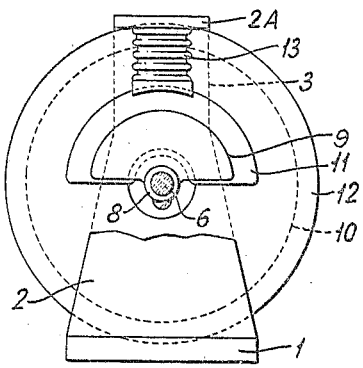
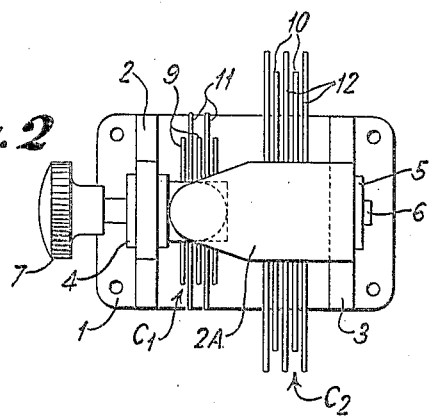
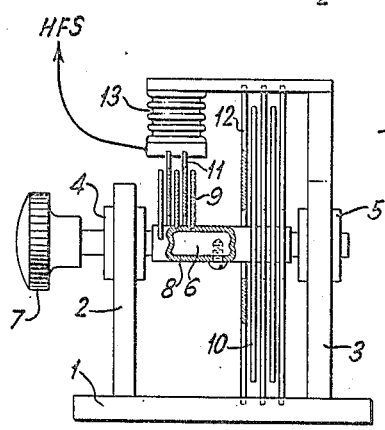
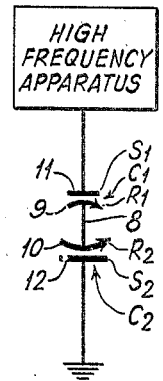
INVENTOR.
HAROLD A. MOORE
BY
ATTORNEY.

Patented Aug. 6, 1940

2,210,494

UNITED STATES PATENT OFFICE 2,210,494

TUNING CONDENSER FOR HIGH FREQUENCY PURPOSES

Harold A. Moore, Riverhead, N. Y., assignor to Radio Corporation of America, a corporation of Delaware Application December 8, 1937, Serial No. 178,656

5 Claims. (Cl. 175—41.5)

This invention relates to a new and novel variable condenser which is particularly adapted for use with short wave or high frequency circuits.

An object of this invention is to eliminate all contact and bearing noises which are present with condensers known in the prior art.

Another object of this invention is to simplify and improve short wave variable condensers and also reduce the manufacturing cost thereof.

A feature of this invention is the novel mechanical arrangement of two condensers both having rotors and stator plates, which are electrically connected together in series. With such an arrangement, the use of contacts through or around the bearings to connect the two condensers together is entirely eliminated for the reason that with this novel construction there is at no time a movable metallic contact over which high frequency currents may pass; therefore, there can be no noise generated in the condenser circuit due to the shaft rotating in the bearings of an ordinary variable condenser.

This invention will best be illustrated and understood by referring to the accompanying drawing, in which:

Fig. 1 is a front view of the variable condenser of this invention;

Fig. 2 is a plan view of Fig. 1;

Fig. 3 is a section of Figs. 1 and 2; and

Fig. 4 is a circuit diagram showing how the variable condenser connects between high frequency apparatus and ground.

Referring now in detail to the drawing, the condenser comprises a rigid metallic base 1 having upright supports 2 and 3 which support bearings 4 and 5 for rotation of the shaft 6. Shaft 6 is preferably made of insulating material and is provided for rotation with a knob 7. Located on shaft 6 centrally between bearings 4 and 5 there is provided a metallic tube 8 upon which is mounted two groups of rotor plates 9 and 10. Rotor plates 9 are preferably of fairly low capacity with respect to rotor plates 10. This is accomplished by having the active capacitive area of the plates 9 small compared with the capacitive area of plates 10; that is, the plates 9 should be several times smaller in area than plates 10, which will give any desirable capacitive ratio difference. For example, a preferred ratio is that of five to one. Upright support 3 has an upper portion 2A which is arranged to support a group of stator plates 11 and 12, the group of stator plates 11 being insulated from the other group 12 by means of a high frequency insulator 13. It will be noted that this novel tuning condenser really comprises two condensers connected in series, as is shown diagrammatically by Fig. 4, condenser $C_1$ being the tuning condenser having semi-circular rotor and stator plates of fairly low capacity, which is connected in series with a grounding condenser $C_2$, consisting of circular stator and rotor plates, and several times the capacity of $C_1$, it being so constructed with the circular plates that it will give a constant capacity, regardless of the axial rotation and the angular displacement of the rotary plates with respect to the fixed plates.

When two condensers are connected in series, the maximum capacity overall can never be more than the capacity of the smallest condenser in the series. Now, let $C_1$ designate the smaller condenser which is variable in capacity from let us say 1.0 $\mu\mu f.$ at minimum capacity to 10 $\mu\mu f.$ at maximum capacity. Condenser $C_2$ consists of a condenser, let us say, 100 $\mu\mu f.$ in capacity and also does not change its capacity with angular rotation. For example, $C_2$ can have a normal stator, but the rotor plates instead of being semi-circular plates may be circular discs.

Now, let us assume that the rotors of both condensers are connected together electrically and are mounted upon the same shaft so that they rotate together. These rotors are not connected to any outside apparatus whatsoever.

Now, if we examine this combination we will find that we have two capacities in series. If we now rotate the rotor to the position of minimum capacity of condenser $C_1$, and then measure the capacity of the series combination, that is, the capacity from stator of $C_1$ to the stator of $C_2$, we will find that the total series capacity will be less than the minimum capacity of $C_1$, neglecting stray capacities. Now if $C_1$ is rotated so that the rotor is in a position to give maximum capacity and we again measure the capacity of the series combination we will find that the total capacity will be less sthan the maximum capacity of $C_1$ which is 10 $\mu\mu f.$ This is due to the law stated in the above paragraph. Mathematically, the series capacity looks like this $$\frac{1}{C_s} = \frac{1}{c_1} = \frac{1}{c_2}$$

$$\frac{1}{C_s} = \frac{1}{10} = \frac{1}{100}$$

$C_s = \frac{1}{.11} = 9.09 \ \mu\mu f.$ which is less than the maximum capacity of $C_1$ $c_1 = 10 \ \mu\mu f.$
$c_2 = 100 \ \mu\mu f.$
$C_s =$ series capacity In both of the above mentioned cases, the value of the capacity $C_2$ remained constant.

The preferred method of connecting this condenser is that the tuning capacity $C_1$ has its stator plates $S_1$ connected to the circuit containing the high frequency apparatus and the rotary plate $R_1$ of this tuning condenser is connected to the rotor $R_2$ of the constant capacity grounding condenser $C_2$. The stator $S_2$ of the grounding condenser $C_2$ is connected to ground. When the tuning condenser $C_1$ is rotated so that it has a minimum capacity, then the minimum capacity of the two condensers $C_1$ and $C_2$ is in series and will be practically that of the tuning condenser $C_1$. When the tuning condenser $C_1$ is rotated so as to give a maximum capacitance, then the capacitance of the condensers in series will be approximately that of the tuning condenser $C_1$.

Although only one form of condenser is shown and described by this invention, it is to be distinctly understood that this invention is not to be limited to the precise form shown. For example, by using two like variable condensers upon the same insulated shaft, (of course both rotors being electrically connected together) in the same manner as mentioned above. The difference being that with both condensers alike and using the semi-circular or other shaped plates in which there is a definite change of capacity with rotation, the minimum capacity of the series combination will be one-half the minimum capacity of a single condenser, and the maximum capacity of the series combination will be also one-half the maximum capacity of an individual capacitor. Therefore, this invention should only be limited by such limitations as are clearly imposed in the appended claims.

What is claimed is:

1. A variable condenser comprising a small group of semi-circular rotor and stator plates and a large group of circular rotor and stator plates forming a unitary structure, each of said rotor plates being mounted upon a common shaft, the small group of stator plates being mounted insulatedly from said large group of stator plates.

2. A variable condenser comprising a first and a second group of rotor plates and stator plates, each group forming a unitary structure, the first group of rotor and stator plates arranged to change its capacity with angular displacement of the rotor plates, the other group of rotor and stator plates being constant in capacity with a change in angular displacement of said rotor plates, the active capacitance area of the individual rotor plates of said first group being smaller than the rotor plates of the other group, and an electrical terminal connection made to each group of stator plates.

3. A variable condenser comprising a small group of semi-circular rotor and stator plates and a large group of circular rotor and stator plates forming a unitary structure, each of said rotor plates being mounted upon a common shaft and electrically connected together, an insulating member for supporting the small group of stator plates adjacent said large group of stator plates whereby the small group of stator plates are electrically connected in series with the large group of stator plates, and terminal means on each group of stator plates.

4. A variable condenser comprising a small group of semi-circular rotor and stator plates and a large group of circular rotor and stator plates forming a unitary structure, an insulating shaft for rotation of said rotor plates, a metallic member secured to said shaft, each of said rotor plates being mounted upon said metallic member to provide a common electrical connection for all of said rotor plates, the small group of stator plates being mounted insulatedly from said large group of stator plates whereby the small group of stator plates are electrically connected in series with the large group of stator plates, and terminal means on each group of stator plates.

5. A variable condenser comprising a small group of semi-circular rotor and stator plates and a large group of circular rotor and stator plates forming a unitary structure, a metallic base member having upright supports, an insulating shaft for rotation of said rotor plates, said shaft having bearing means in said upright supports, a metallic member secured to said shaft, each of said rotor plates mounted upon said metallic member to provide a common electrical connection for all of said rotor plates, the small group of stator plates being mounted insulatedly from said large group of stator plates.

HAROLD A. MOORE.